Figure 1:
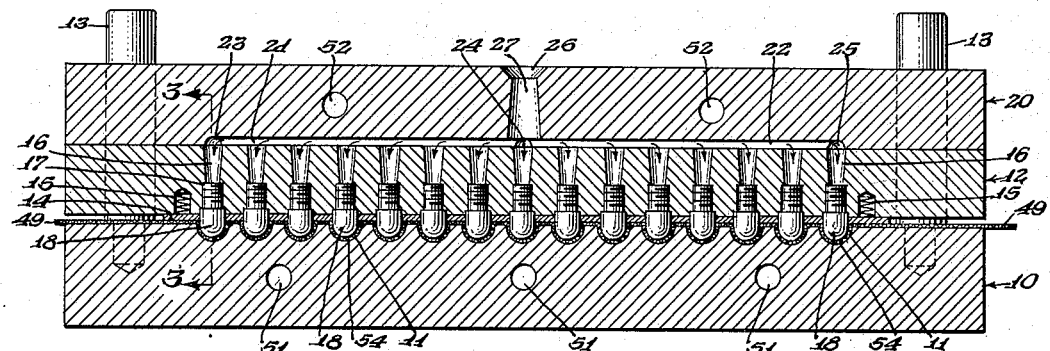

Nov. 17, 1942.  L. NAST  2,302,342

DECORATED MATERIAL AND TRIMMING

Filed Jan. 30, 1940  2 Sheets-Sheet 1

INVENTOR.
Leon Nast
BY
J. O. Ollier
ATTORNEY.

Nov. 17, 1942.   L. NAST   2,302,342
DECORATED MATERIAL AND TRIMMING
Filed Jan. 30, 1940   2 Sheets-Sheet 2

INVENTOR.
Leon Nast
BY
J. O. Ollier
ATTORNEY.

Patented Nov. 17, 1942

2,302,342

UNITED STATES PATENT OFFICE 2,302,342

DECORATED MATERIAL AND TRIMMING

Leon Nast, New Brunswick, N. J.

Application January 30, 1940, Serial No. 316,325

3 Claims. (Cl. 41—24)

This invention refers to decorated materials and trimmings for any purpose, in particular to a material for making curtains, draperies, pillows, upholstery for furniture, furniture trimmings, pocketbooks, collars and cuffs, belts, scarfs, dress trimmings, hat trimmings, shoe trimmings, shoe straps, picture frames, book covers.

According to the invention a preferably sheet-like and somewhat porous or fibrous base, in particular a fabric of any material, such as cotton, natural or artificial silk, wool, asbestos, or any mixture thereof, or a preferably sheet-like body of non-porous material as of cellulose derivatives ("Cellophane") is on one or both sides provided with ornaments of any shape, size and configuration made of moldable plastic material. As moldable material a thermoplastic material, such as cellulose acetate is preferred.

In general, for the production of the ornaments any plastic material, including thermosetting material, may be used which is moldable and to be molded at temperatures and solidified or cured for periods of time which do not materially affect, in particular, carbonize the material of the base.

The moldable plastic material of which the ornaments are made may be of any desired color, and in particular a plurality of ornaments applied to the base material, may be of the same or different colors. The material may also be either opaque, translucent or transparent. Any desired effect can be obtained by composing a larger ornament of smaller individual parts which are of the same or different shape and size, of the same or different colors, and entirely or partly opaque, translucent or transparent.

According to the invention the ornaments of moldable plastic material are fastened to the porous or fibrous base by anchoring the ornament within the pores or interstices of the base. The moldable plastified material is caused to penetrate through the pores or interstices of the base during the manufacture of the individual ornament and some of the material remains within the pores or interstices and thereby secures a permanent connection between the ornament and the base. According to a particular feature of the invention ornaments are provided on both sides of the base, and particularly in alignment with each other, so that the decorated material can be used with both sides exposed.

The invention also embraces a method of manufacturing a decorated material in such a way that moldable material in its plastic state is pressed at confined places, conforming substantially to the desired configuration of the ornament, from the reverse side of the base through the latter into a mold applied to the front side of the base which is exposed during subsequent use. The mold is provided with a cavity forming the negative of the desired shape of the individual ornament, and the plastic material pressed through the base fills the cavity and, upon cooling, results in the desired ornament, a portion of which is anchored within the pores or interstices of the base material.

The reverse side of the base thus united with the ornament can then be covered, if desired, in a second process step of manufacture with like moldable plastic material of the same or different color, and other characteristics of appearance the same or different than those of the plastic material used to produce the ornament on the front side in the first process step.

Thus it is an object of the invention to provide a new article of manufacture substantially consisting of a porous or fibrous body, preferably a sheet-like flexible material as a base and ornaments of moldable plastic material arranged on one or both sides thereof and permanently united therewith.

It is another object of the invention to provide a new article of manufacture composed of a fabric and ornaments of moldable plastic material on one or both sides, the ornaments and fabric being firmly and permanently united.

It is still another object of the invention to provide a new article of manufacture composed of a porous or fibrous, preferably sheet-like base provided with ornaments of moldable plastic material on one or both sides, the ornaments being firmly anchored within pores or interstices of the base.

It is a further object of the invention to provide a new article of manufacture composed of a flexible porous or fibrous, or flexible non-fibrous and sheet-like base and ornaments of moldable plastic material on one or both sides, with portions of the material used for the ornaments penetrating through pores, interstices or other openings of the base to its other side and thereby firmly and permanently uniting the ornaments with the base.

It is still another object of the invention to provide a new article of manufacture composed of a fabric of one color, or color composition which is provided with one or more ornaments of plastic material projecting therefrom, the ornaments being firmly and permanently united with the base and of the same or different color, or color composition, than the base and composed of a plurality of individual parts of the same or different color, or color composition, and the same or other characteristics inter se as to opaqueness, translucency or transparency.

The invention also contemplates a new process of manufacture with the object of producing the ornament of moldable plastic material in contact with the flexible porous, fibrous or non-fibrous base in an efficient and non-expensive manner.

Thus it is another object of the invention to manufacture in a single step a decorated material composed of a porous or fibrous base and ornaments of moldable plastic material by molding the plastic material directly onto selected and confined places of the base.

It is another object of the invention to produce an ornament of moldable plastic material on a porous or fibrous, preferably sheet-like flexible base by molding the ornament directly on the base.

It is still another object of the invention to produce the ornament of moldable plastic material on the porous or fibrous, preferably sheet-like base in such a way that the ornament comes into existence in contact with the base and is simultaneously firmly and permanently anchored therein.

It is still another object of the invention to produce a decorated material by molding in a first step a moldable plastic material onto a confined place on one side of a permeable, or porous, or fibrous base, and to mold in a following step another ornament or cover of moldable plastic material onto substantially the same confined place on the other side of the base.

Figure 2:
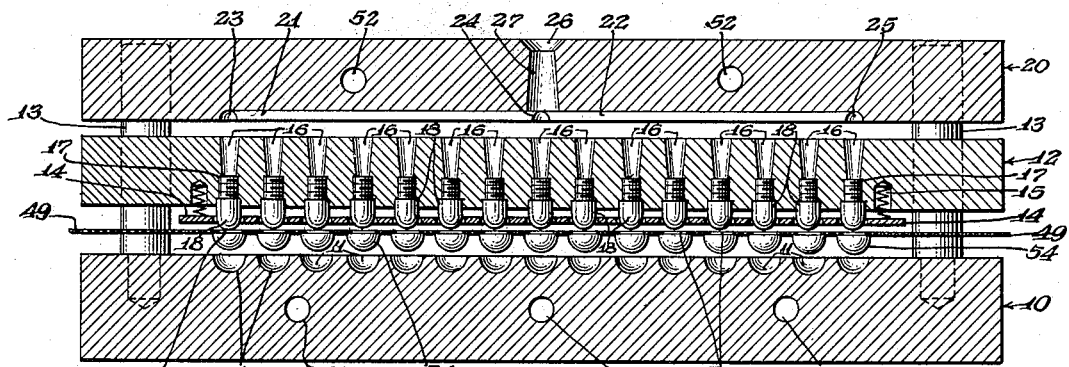
Figures 3, 6, 7, 8:
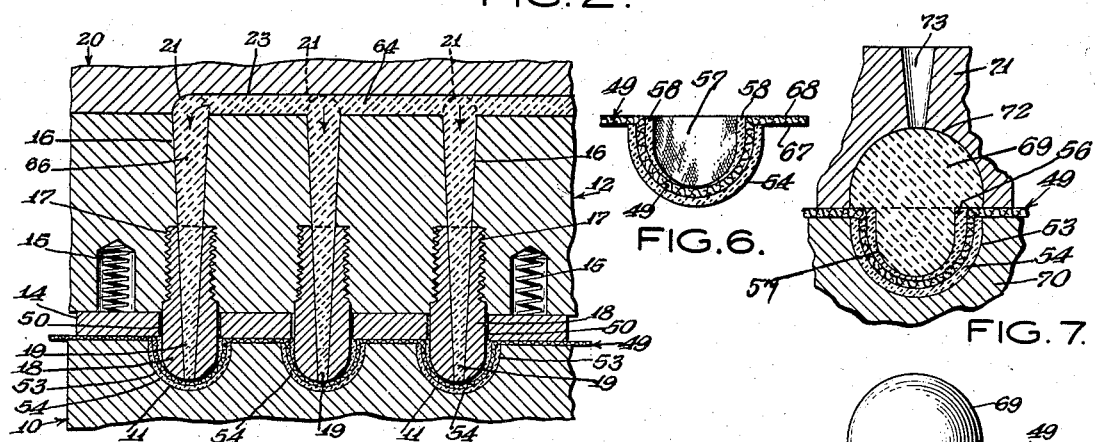
Figures 4, 5:
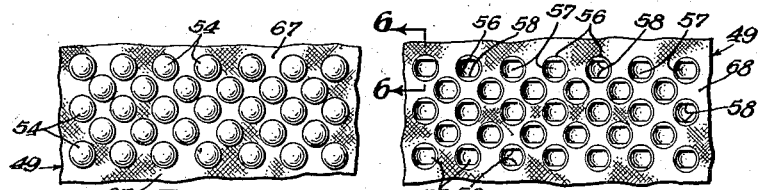
Figure 9:
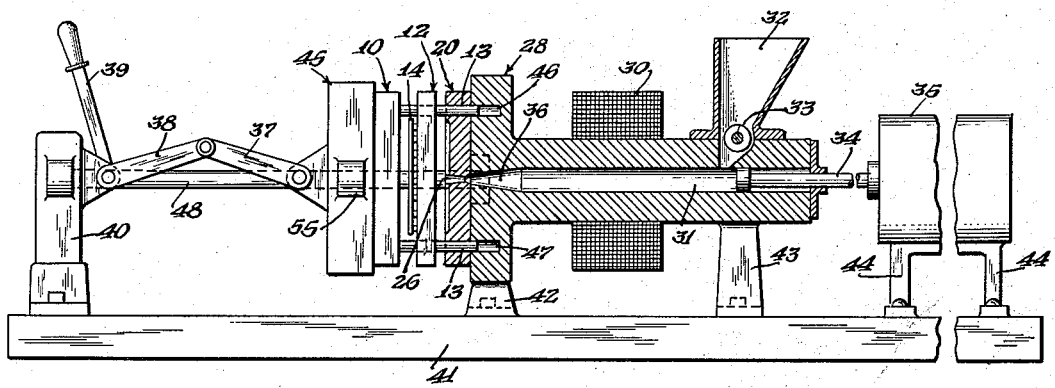
Figure 10:
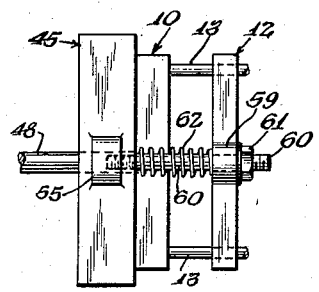
Figure 11:
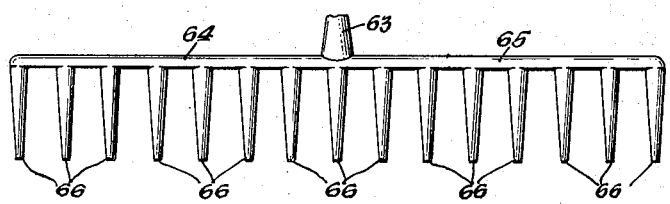

These and other objects of the invention will be more clearly understood as the specification proceeds with reference to the drawings in which Fig. 1 shows a cross-section through a closed mold adapted to manufacture a decorated article according to the invention; Fig. 2 a cross-section through the same mold when open; Fig. 3, on a considerably enlarged scale, a cross-section through the closed mold according to Fig. 1 and along line 3—3 thereof; Fig. 4, on a somewhat smaller scale, a plan view of the lower or exposed side of the article completed in a mold according to Figs. 1 and 2; Fig. 5 the upper or reverse side of that article, also on a somewhat smaller scale; Fig. 6, on a considerably enlarged scale, a cross-section along line 6—6 in Fig. 5; Fig. 7, on a considerably enlarged scale, a cross-section through a portion of another mold in which in a second step an ornament of moldable plastic material is applied to a portion of the upper or reverse side of the base of an article completed in the mold according to Figs. 1 and 2; Fig. 8 in elevation and partly in cross-section a portion of the thus finished product; Fig. 9 more schematically a machine for molding under pressure, particularly by injection ornaments upon a base; Fig. 10 a detail of the machine in side-elevation; and Fig. 11 in side-elevation a portion of the plastic material solidified within the channels and passages of the mold and machine, respectively.

Like reference numbers in different figures identify similar parts.

Referring to Figs. 1, 2 and 3, a mold is shown consisting of a plate 10 provided with cavities 11 on one side. Any desired number of such cavities may be provided, which may be of any desired shape or size, equal or different inter se.

For simplicity's sake, cup-shaped cavities all of the same size are exemplified in the drawings.

The cavities are preferably arranged in rows. Fig. 3 shows an arrangement of three rows in parallel, although any desired number of rows, one as a minimum, may be provided. The mold further comprises a plate 12 slideably arranged on bolts 13 fastened to plate 10 in any convenient manner. Any desired number of bolts 13 may be provided so as to secure and facilitate the movement of plate 12 in operation.

Between plates 10 and 12 a stripper plate 14, or other suitable stripping means, are provided. Coil springs 15, or other elastic means, serve to press the stripper plate 14 away from plate 12 when the mold is opened, as can be seen from Fig. 2.

Plate 12 is traversed by a number of holes each shown with an upper part 16 tapered towards the inside of the plate and continued by a screw threaded portion 17 of larger diameter than the inner end of the tapered portion 16. Plugs or forcers 18 are screwed into the screw threaded portions 17. Any other connection between these plugs and plate 12 may be provided depending on whether an exchange for repair or producing other shapes is contemplated. It is to be understood that, if desired, instead of removable plugs their projecting portions could be made in one piece with plate 12.

As can be seen from the enlarged cross-section of Fig. 3, the plugs are provided with a center hole 19 tapered towards their lower ends and forming substantially the continuation of the tapered channel 16 in plate 12.

Another plate 20 is slideably arranged on bolts 13 and provided with a number of shallow inlet grooves or passages 21, 22, open towards plate 12 and in substantial alignment with the upper openings of the holes or channels 16. The number of passages 21, 22 corresponds to the number of rows of holes 16 provided in plate 12. The passageways 21, 22 for different rows communicate with each other through cross-passages or grooves 23, 24, 25. In Fig. 3 the arrangement of the cross- and longitudinal passages, particularly of cross-passage 23 and longitudinal passages 21 is illustrated.

26 forms an inlet and 27 an outlet portion of a channel, particularly injector nozzle through which the plastified material is pressed into the inlet passages; these portions are tapered towards each other.

Fig. 9 shows diagrammatically a machine in which the mold shown in Figs. 1 and 2 can be used. Plate 20 is rigidly but removably attached e. g. by means of screws (not shown) to plate 28 of a machine of the well known type of an injection machine, and for simplicity's sake, as to description, I refer to my co-pending applications Ser. No. 128,191, filed February 27, 1937, and Ser. No. 175,577, filed November 20, 1937, where such a machine is described in more detail.

Plate 28 is attached to a pressure cylinder 29 surrounded by an electrical heating coil 30. Powdered moldable material is fed from hopper 32 into cylinder hole 31 by means of an intermittently rotated feeding screw or the like 33, and a plunger 34 is then driven into hole 31 by means of a hydraulic cylinder 35 (not shown in detail). Thereby the material fed in predetermined amount into cylinder hole 31 is moved through the latter, passes the heating zone of coil 30 and enters nozzle 36 which is in alignment with and tightly pressed against nozzle 26 of plate 20. The mold is closed by means of a toggle lever 37, 38 and handle 39. Lever 37 is pivotally connected with a slideable pressure plate 45 to which plate 10 is rigidly but removably connected (e. g. by means of screws, not shown). Bolts 13 enter corresponding holes 46, 47 in plate 28 and may serve as guide for the opening and closing of the mold. Preferably guiding bars 48 are provided on opposite sides of plate 45 and engaged by lugs 55 on plate 45. Lever 38 is pivotally connected with post 40. 41 is a base plate on which post 40 and supports such as 42, 43 and 44 for various parts of the machine are mounted.

The guiding bars 48 are rigidly connected at one end with plate 28 and at the other end with post 40.

In operation, the mold is opened by breaking the toggle lever 37, 38 by swinging handle 39 to the left.

A strip 49 of desired, preferably sheet-like material, such as a woven fabric, gauze of threads or wire, in one or more layers is inserted into the opened mold between the stripper plate 14, or any other suitable stripping means, and plate 10. Then the mold is closed by turning handle 39 to the right, whereby plate 10 is moved towards plates 12 and 20 and eventually all the plates are pressed together to form the closed mold as shown in Fig. 1.

It will be appreciated that while the mold is closed the plugs or forcers 18 are forced into strip 49 at places confined by the circumferences of the cavities 11 and holes 50 in the stripper plate. Thus the strip will be pressed into the cavities 11. If the material is not elastic enough, it might be torn partially, but only within the confined space as defined above, and without being entirely cut off from the strip of material outside the cavity. Thus also openings in a non-porous base can be produced.

Now moldable plastified material, preferably of the thermoplastic type, such as cellulose ester, and particularly acetyl cellulose acetate, of any desired color and to be made into a transparent, opaque or translucent product, is pressed into nozzle 26 by means of the power driven plunger 34 and through nozzle 36. From there it passes through nozzle 27 and longitudinal passages 21, 22 of each row to the inlet channels 16, and through them and the holes 17 into the cavities 11 in which shaped or even torn portions of strip 49 are positioned. The material flows through the pores or interstices of the strip, or openings produced by tearing of the strip, into the cavity and fills it completely.

In Fig. 1 the direction of flow of the plastified material through passages 21, 22 into the holes is shown by arrows.

The material flows also through the cross passages 23, 24, 25 to other parallel rows as shown by arrows in Fig. 3.

Thus eventually all the cavities of all rows are filled with the plastified material.

In the case of thermoplastic material the mold is provided with channels 51, 52 through which a cooling medium, such as faucet water or artificially cooled water, is passed while the mold is closed. Thereby the thermoplastic material is quickly cooled and solidified.

In order to take care of shrinking, plunger 34 is kept under hydraulic pressure until after the plastic material in the mold is completely solidified so that additional plastified material is fed into the mold while shrinking occurs and all the spaces in the mold and cavities are completely filled.

It will be appreciated that by pressing the plugs 18 into the confined spaces of strip 49, the strip is closely pressed against the plugs, so that a space 53 is left free for the plastic material to completely cover the strip on its lower side and form a cup-shaped cover thereof. It will also be appreciated that the thickness of this cover depends upon the dimensions of the cavity, in particular the distance of its inner surface from the outer surface of the plug.

While in the drawings a relatively thin cover is shown, which is sufficient, however, to give the cover any desired strength so as to retain its shape for all purposes of normal use, the cavities may leave a larger space free and be of any other shape than cup-shape as shown in the drawings for the sake of simplicity.

While the plugs may have the same shape and size inter se, the cavities may be of different shape, such as square or rectangular shape, diamond shape etc. If desired, but not necessarily so, the outer shape of the plugs cooperating with the cavities may be of the same or similar shape as the cavities, but always leaving sufficient space for both the strip and the cover to be formed on one side thereof.

As can be further seen from the drawings, particularly Fig. 3, strip 49 will contact the plugs on their projecting portion and be closer to the cavity near the place where the latter ends in the upper surface of plate 10. The plastified material will penetrate the pores, openings or interstices of the strip and flow around the threads or other coherent portions of the strip lying within this cavity whereby it is firmly held in its place relative to the strip and anchored therein.

Experience has shown that a single channel 19 as shown in the drawings suffices for producing a cover 54. However, it is feasible that branch channels can be provided within the plug, particularly, when a relatively large cover is to be produced.

The cooling means can be supplied by means of flexible tubes (not shown). Practical experience has shown that within 20 to 180 seconds the process of manufacture as described is completed, depending upon the size of the covers to be manufactured, and then the finished article can be removed.

In order to remove the completed article, handle 39 is moved to the left. Hereby the toggle lever 37, 38 is broken off and plate 45 moved to the left, whereby plate 10 is taken along and the mold opened. While the mold opens, stripper plate 14 is pressed away from plate 12 by springs 15, and strip 49 united with covers 54 stripped off the plugs 18 and can now be removed.

When the mold is to be opened by means of lever 39, plate 12 has to be brought into position according to Fig. 2, and this can be done either by hand by the workman controlling the operation of the machine, or by means of a structure as shown in Fig. 10, where plate 12 is provided with lugs 59 on opposite sides, through which bolts 60 pass, the ends of which are screw-threaded and provided with nuts 61 while springs 62 are arranged between plate 45 and lugs 59 (in Fig. 10 one each of these parts is shown on one side of the machine). When the mold is opened, spring 62 will first separate plate 12 from plate 10 until lug 59 strikes nut 61, and upon continued movement of plate 45 to the left, plate 12 will be drawn along and separated from plate 20 to a desired distance.

While plates 10 and 12 separate, the stripper plate 14 is pressed off plate 12 by springs 15, and the strip 49 with covers or ornaments 54 just produced thereon can now be easily removed from the machine. The plastic material solidified in nozzle 27, passages 21, 22 and 23 can also be removed in the form, shown in Fig. 11. It will be appreciated that stud 63 was previously placed in nozzle 27, branches 64, 65 in the passages 21, 22 and stud 66 in channels 16, 19. In order to remove them, plate 12 has to be separated far enough from plate 20 and its bolts 13 must be long enough to effect a proper spacing.

The material of parts 63, 64, 65, 66 can be mixed with other raw material and be used again, as is well-known in the thermoplastic art. After parts 63 to 66 have been removed the mold is ready for the next operation.

The product obtained will look on its lower or exposed side 67 as shown in Fig. 4 where the covers 54 form the desired cup-like ornaments of plastic material firmly and permanently connected with and anchored in the strip. The upper or reverse side 68 will look as shown in Fig. 5, where the material of the covers penetrated the strip at 56 and is accumulated on the sides of the holes 57 formed in the hollow projections of strip 49 by the plugs 18 when forced into the latter.

In an enlarged cross-section, a portion of the new product will look as shown in Fig. 6, which requires no further explanation.

Sometimes it is advantageous to make the plugs 18 asymmetrical, preferably to flatten them on opposite sides where they project downwardly beyond stripper plate 14 in the closed position of the mold, so that additional plastic material may flow into the larger spaces between the opposite flattened sides of the plug and the cup-like cavity. The effect of this is shown in Figs. 5 and 6, where a larger amount of material accumulated at opposite sides 58 is shown, resulting from correspondingly flattened portions of the plug.

If two or more nozzles and hoppers are used in the machine, as well known in the art and particularly shown in my co-pending applications referred to above, e. g. each row of plugs may be fed with plastic material of different characteristics, such as color; or, e. g. transparent material may be used for one row, and opaque material for another. As will be appreciated by anyone skilled in the art, any desired variation as to color, transparency, translucency or opaqueness can be arrived at by the use of a corresponding number of hoppers, ejector nozzles and inlet passages leading to selected inlet holes 16.

It will be appreciated further by those skilled in the art that the cavities need not be of the same shape or size, but any desired variation can be brought about in this respect as well as their relative arrangement without deviating from the idea underlying the invention, in order to obtain a desired composite ornament. The arrangement shown in the drawings has been selected for the sake of simplicity only, and it is to be understood that the invention is by no means confined to any shape, size, or configuration of the ornaments and disposition of passages, cross passages, mold or parts thereof, but is to be derived in its broadest scope from the appended claims.

If thermosetting materials, such as resin plastics are used, the process is the same in principle as described above. Instead of thermoplastic material, thermosetting material is fed through nozzle 36 into the mold. It is also heated, if desired, to its plastic state. While it is in the mold, instead of a cooling medium, steam of sufficient pressure is fed to channels 51, 52 in order to produce the desired heat for complete conversion and solidification (curing) of the material. This can be done e. g. within 3 to 10 minutes. Care should be taken, however, that the temperature developed in the mold does not impair or destroy the material of strip 49. If a fabric e. g. of asbestos or wire gauze is used, very high temperatures and fast processing may be applied. If base materials are used which are liable to carbonize, lower temperatures have to be applied. However, since air has no access to the interior of the closed mold burning off of the material is prevented to a certain extent. It is also possible to apply a protecting varnish, such as a phenol-formaldehyde varnish, for protecting the fabric against deterioration in the mold.

As can be seen from Fig. 6, the new article of manufacture has an exposed (or front) side 67 and a reverse side 68, to which I will refer also in the appended claims. The ornaments 54 are applied to the exposed side, and the reverse side shows a hole 57. If the thus decorated material is intended to be used with both sides visible, it might be desirable to have the holes 57 covered.

To this effect strip 49 with ornaments 54 is positioned in another mold, Fig. 7, comprising a plate 70, substantially the same as plate 10, onto which strip 49 with ornaments fits therefore. To the reverse side of strip 49 another plate 71 is applied having a cavity 72 connected with a channel 73 tapered towards the cavity. Cavity 72 may be cup-shaped the same way as cavity 11, as shown in Fig. 7, or of any other shape or size; plate 71 may even be flat or convex and in the latter case project somewhat into hole 57. Through nozzle 73 plastified material preferably of the same kind, i. e. acetyl acetate, if it was used for producing cover 54, is pressed in or injected, and its color, transparency or opaqueness may be the same as that of cover 54, though it is possible to use another color, or to make it i. e. transparent if cover 54 is opaque, etc. Any variation and ornamental effect can be obtained, as will be appreciated by anyone skilled in the art without further illustration.

The plastified material 69 pressed into cavity 72 is cooled and coalesces with the material 56 of the ornament previously applied. In this respect a process as described for instance in my copending application Ser. No. 175,577, referred to above, may be used, and as to its operation I refer to the description in the aforementioned application.

The new article of manufacture thus obtained is of an appearance as shown in Fig. 8, where 54 is the ornament applied to the exposed side of strip 49 in the first step, and 69 that applied to the reverse side in a second step, as described with reference to Fig. 7.

It should be understood however that the ornament 69 shown in Figs. 7 and 8 as projecting from the reverse side of the base 49 may be of any other shape, and particularly form merely a filler, or cover of hole 57. In the latter case, it may not project at all or even be concave, as will be understood by anybody skilled in the art and therefore does not need particular illustration.

It will be appreciated that by the process of manufacture hereinbefore described, plugs or forcers are used to bend the base outwardly into the cavity of the mold whereby the base is either torn and openings made therein, or pores or interstices present therein are forcibly enlarged. The flowing of the plastified material through the base into the cavity and the penetration of the base by the plastified material and its anchoring in the base is thereby considerably facilitated.

In addition, the plugs or forcers fill a considerable portion of the cavity whereby the amount of plastic material for the ornament is reduced to the smallest possible amount permitting to form a rigid, coherent and smooth cover on the exposed side of the base.

It will also be appreciated that instead of a flat permeable base or fabric, as illustrated hereinbefore, a permeable base or fabric may be used which is provided with pre-shaped hollow projections into which the plugs or forcers 18 fit. The pre-shaped hollow projections may also be of different shape than the plugs and then finally shaped, particularly enlarged by the plugs or forcers when pressed from the reverse side of the base or fabric into the pre-shaped hollow projections.

Although the saving on plastic material forms a substantial advantage of the invention, it should be appreciated that my invention also embraces the feature in which shorter or no plugs or forcers whatsoever are used and the flat and permeable base is positioned in front of the cavity and the plastic material is pressed through it to fill the cavity and form the desired projecting ornament. In the latter case it is important, however, that the base be porous or provided with interstices through which the plastified material can penetrate so as to fill the cavity and be anchored in the base. If the base is non-porous and without interstices they should be produced by piercing the thin base within confined places to lie in front of the cavities. Thus a sufficient number of needleholes may be pierced into a thin non-fibrous base, such as consisting of one or more layers of celulose derivatives, and it is also feasible than thin sheets of other material which is flexible or somewhat rigid, such as of metal, are provided with a number of holes within a confined space to lie in front of the cavity, through which the plastified material is pressed.

It is therefore within the idea of the invention that an ornamental product as shown in Fig. 8 be manufactured in such a way that a permeable strip (base), which may be preshaped to form a projection or may even be flat, is positioned between two mold cavities as shown in Fig. 7, and the plastified material pressed through nozzle 73 into cavity 72, then through strip 49 and eventually into the cavity of plate 70. Thus in a single process both the portions 69 and 54 are molded onto opposite sides of strip 49 and, upon solidification, permanently united therewith.

It is also to be understood that instead of pure plastic moldable material a mixture of it with any desired filler may be used, the latter being finely divided and intimately admixed with the powdery plastic material before it is pressed into the cavity, it being a condition that the particle size of the filler is small enough to easily penetrate the holes or interstices of the base without clogging them. Inserts may also be arranged in the cavities before they are covered by the base so that upon pressing the plastified material into the cavity, the plastified material flows around the insert and upon solidification keeps it rigidly in place. Such inserts may consist, for instance, of rhinestones or other ornamental parts.

It is to be understood that my invention is not limited to any specific example referred to herein or shown for illustration purposes but to be derived in its broadest aspects from the appended claims.

What I claim is:

1. As a new article of manufacture, a permeable fabric preshaped within a confined place so as to form a hollow projection, a cover of plastic material molded onto the convex outside of and substantially covering said projection so as to form an ornament, said material also being traversed by and thereby permanently united with said fabric.

2. As a new article of manufacture, a permeable fabric preshaped at a confined place so as to form a hollow projection, an ornament of plastic material molded onto the convex outside of and substantially covering the convex outside of said projection, said material also being traversed by and thereby permanently united with said fabric, and a cover of plastic material applied to the concave inside of said projection and united with said penetrating material and fabric.

3. As a new article of manufacture, a porous fabric preshaped at a confined place to form a hollow projection on one side of said fabric, an ornamental cover for said projection substantially of thermoplastic material molded onto the convex outside of said projection and traversed by and thereby united with said fabric at least at said confined place, another cover substantially of thermoplastic material molded onto the other side of said fabric at least into the concave hole of said projection and united with said penetrating material and said fabric.

LEON NAST.